Jan. 19, 1954

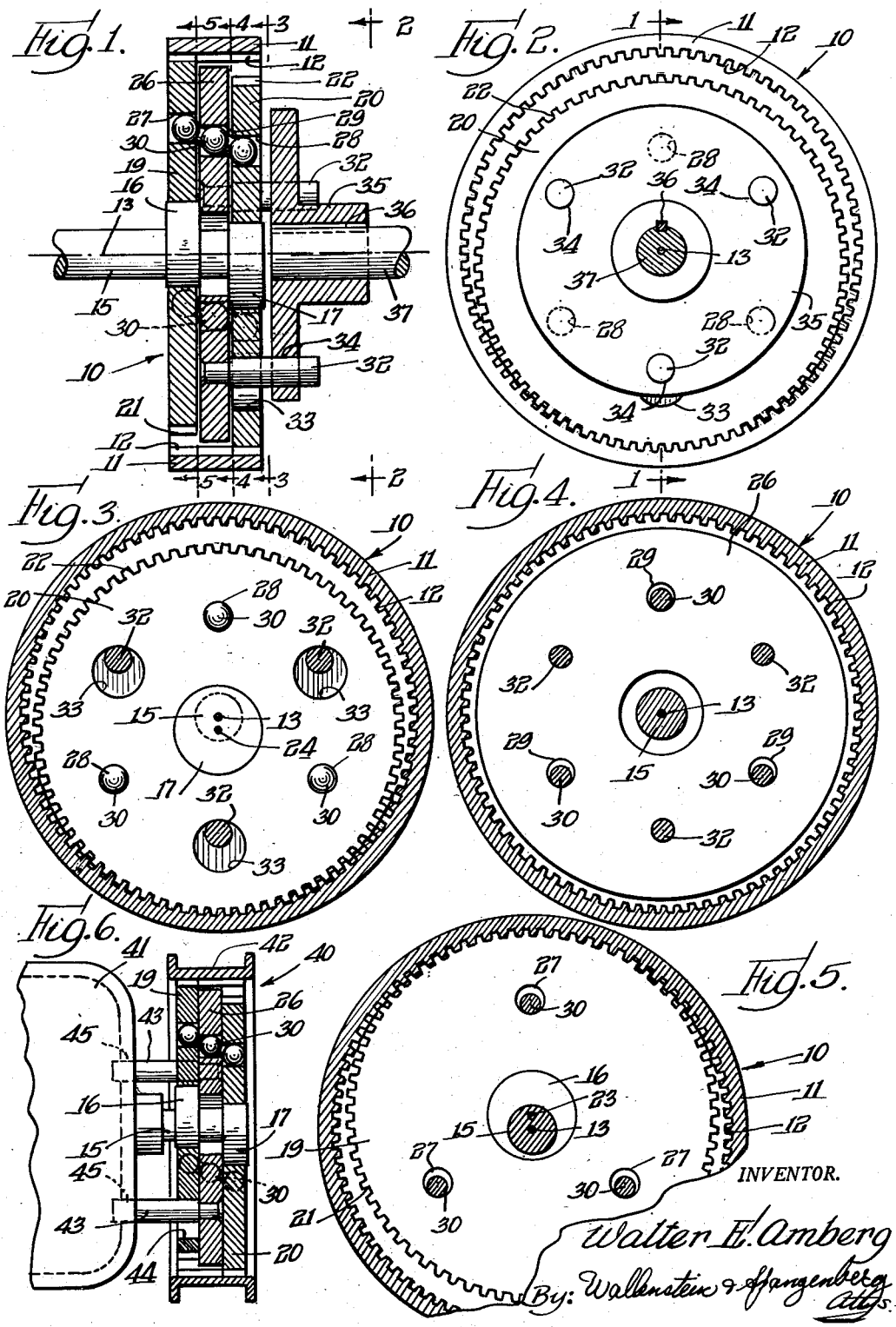

W. E. AMBERG 2,666,345

SPEED REDUCER

Filed Oct. 29, 1951

INVENTOR.

Walter E. Amberg

By Wallenstein & Spangenberg

Attys.

Jan. 19, 1954 W. E. AMBERG 2,666,345
SPEED REDUCER
Filed Oct. 29, 1951 5 Sheets-Sheet 3
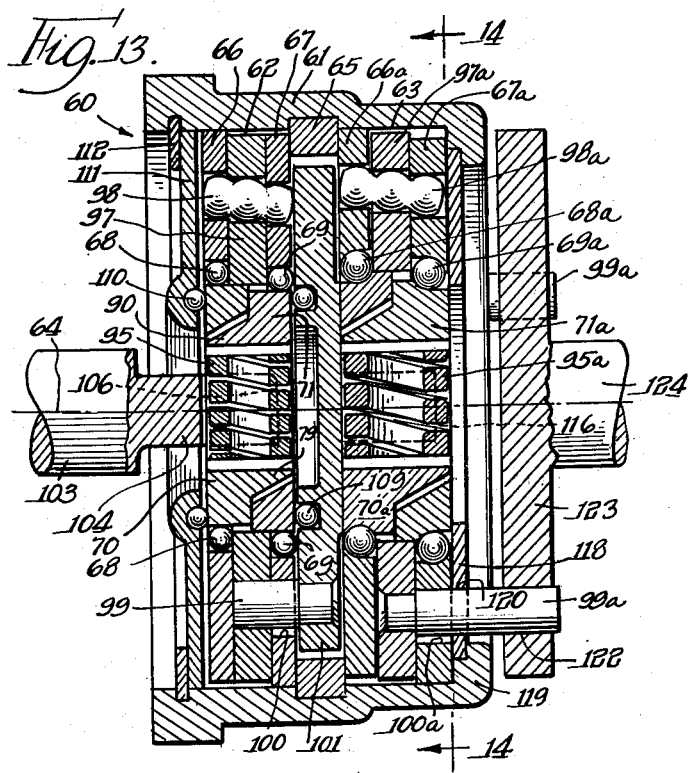
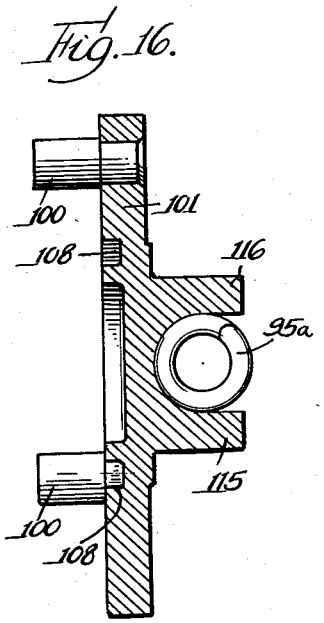
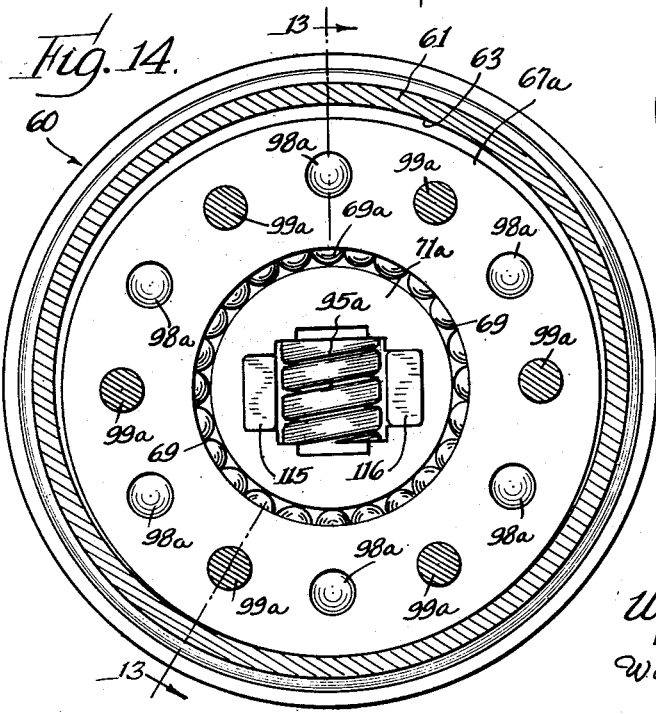
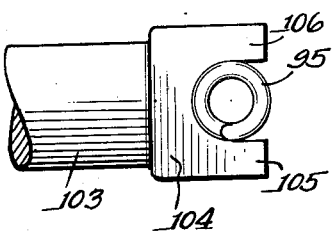
INVENTOR.
Walter E. Amberg
BY
Wallenstein & Spangenberg
Attys.

Jan. 19, 1954 W. E. AMBERG 2,666,345
SPEED REDUCER
Filed Oct. 29, 1951 5 Sheets-Sheet 4
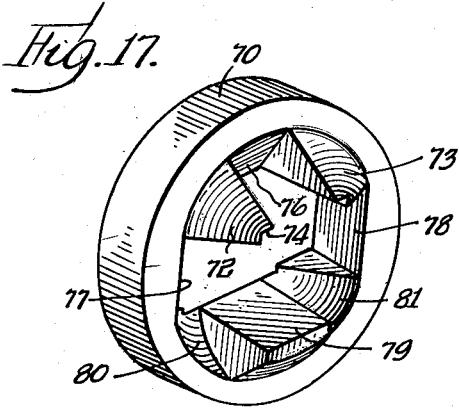
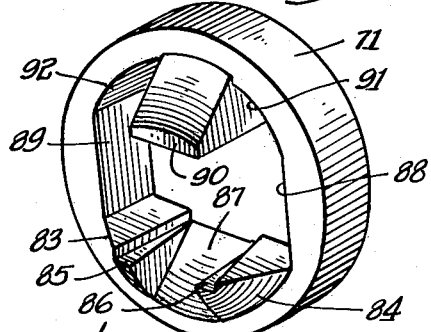
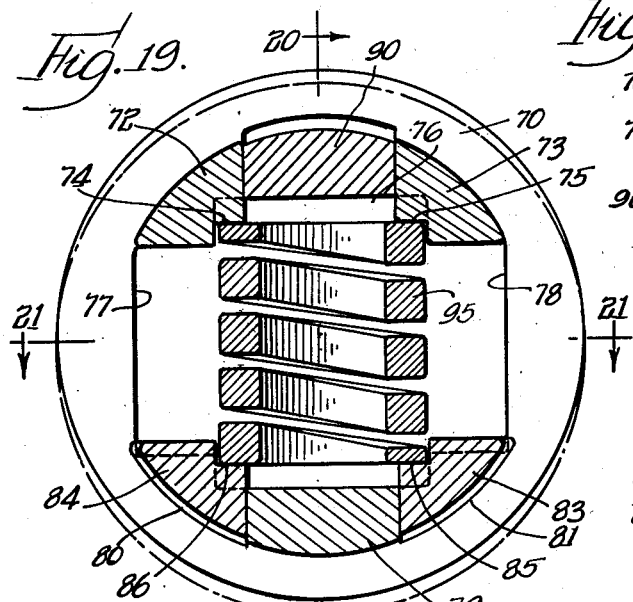
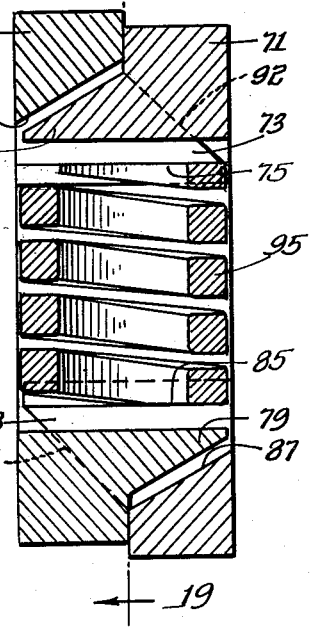
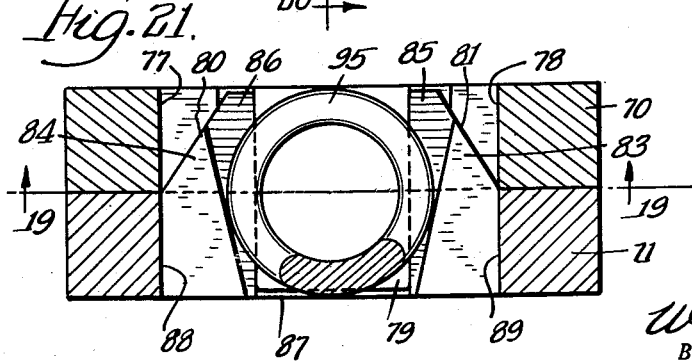
INVENTOR.
Walter E. Amberg
BY
Wallenstein & Spangenberg
Attys.

Jan. 19, 1954   W. E. AMBERG   2,666,345
SPEED REDUCER
Filed Oct. 29, 1951   5 Sheets-Sheet 5
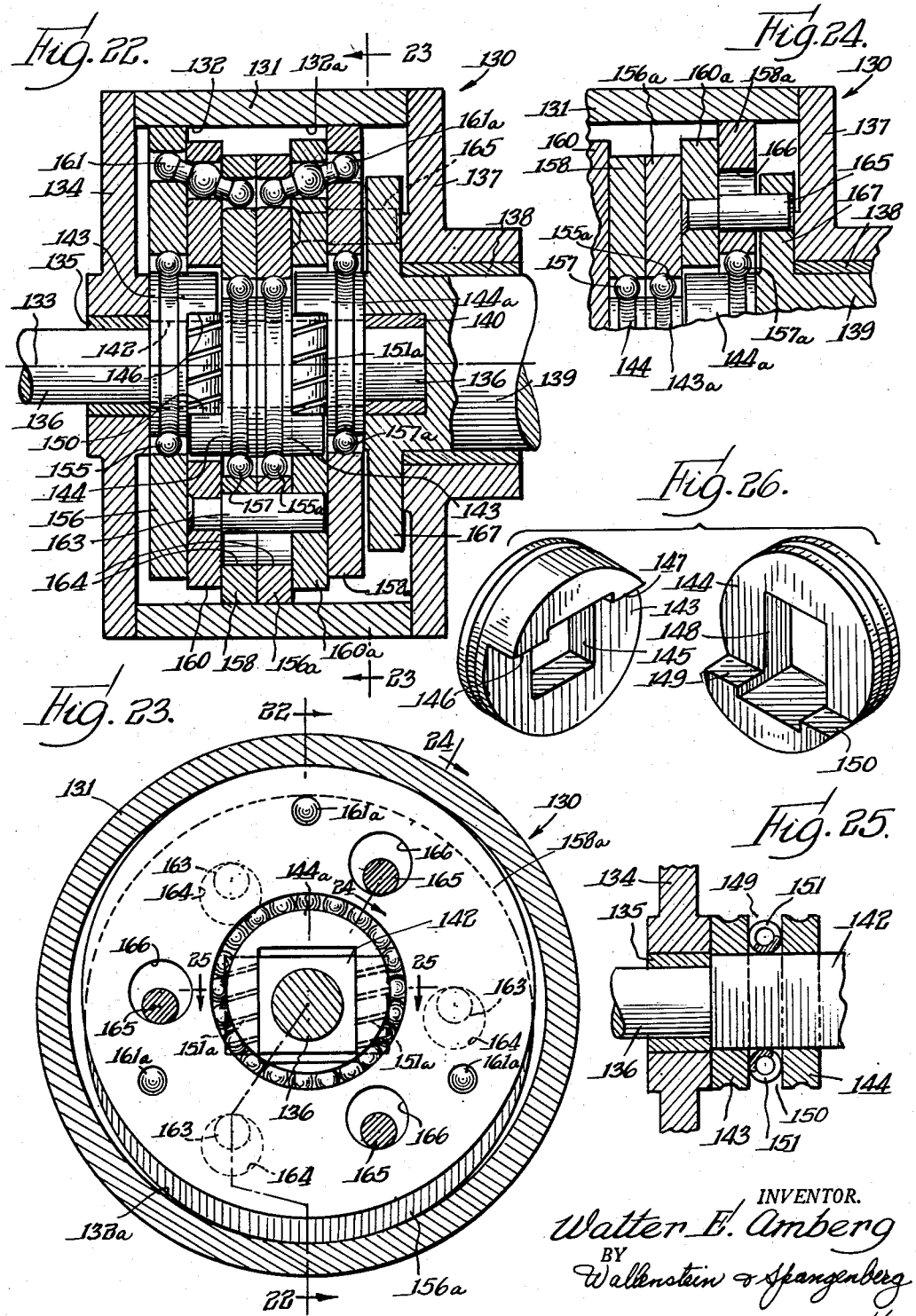
INVENTOR.
Walter E. Amberg
BY
Wallenstein & Spangenberg
attys Patented Jan. 19, 1954

2,666,345

UNITED STATES PATENT OFFICE 2,666,345

SPEED REDUCER

Walter E. Amberg, Chicago, Ill.

Application October 29, 1951, Serial No. 253,690

37 Claims. (Cl. 74—804)

This invention relates to speed reducers.

The principal object of this invention is to provide an improved speed reducer of an internal ring orbital motion type wherein there is provided an improved harness between the eccentric and concentric motions thereof, wherein large speed reduction ratios are obtained with a minimum of moving parts in a unit of comparatively small dimensions, wherein vibrations in the unit are maintained at a minimum, wherein large loads and torques are readily handled, wherein uniform torque and speed relations between the input and output ends of the speed reducer are obtained, wherein internal resistance is maintained at a minimum to produce high efficiency, wherein manufacture with extremely close tolerances is not required, and wherein manufacturing costs are maintained at a minimum.

Briefly, the speed reducer of this invention includes an internal ring member and a pair of connected opposed eccentrics rotatable about an axis concentric with the central axis of the internal ring member. A pair of wheels of smaller diameter than the internal ring member are carried by the eccentrics in opposing peripheral driving contact with the internal ring member. Rotation of the eccentrics causes orbital movement of the pair of wheels about the central axis of the internal ring member and relative rotation between the pair of wheels and the internal ring member. Because of this opposed and balanced arrangement, vibration is maintained at a minimum and the axes of rotation of the eccentrics is automatically centered with respect to the central axis of the internal ring member.

An intermediate member is disposed between the pair of wheels and whippletree driving connections are provided between the pair of wheels and the intermediate member. These whippletree driving connections automatically concentrically position the intermediate member with respect to the central axis of the internal ring member to provide a completely balanced arrangement. These whippletree connections also establish a positive and uniform driving relation between the pair of spaced wheels and the intermediate member to produce uniform relative rotation between the intermediate member and the internal ring member. Connecting means are secured to the intermediate member and they may extend through enlarged openings in at least one of the wheels. The difference between the speed of rotation of the eccenerics and the speed of relative rotation between the intermediate member and the internal ring member, that is the amount of speed reduction, is dependent upon the ratio of the wheel diameter to the difference between the wheel and ring diameters.

The whippletree connections between the pair of wheels and the intermediate member may include a plurality of openings in the nature of sockets in each of these elements, the openings being correspondingly located with respect to their respective central axes. A plurality of whippletree levers are carried in these openings and extend between the pair of wheels and the intermediate members. As the wheels are orbitally moved about the central axis of the internal ring member by the eccentrics, 180 angular degrees out of phase with each other, the ends of the whippletree levers are also moved 180 angular degrees out of phase with each other through true circles. The whippletree levers are, therefore, so moved in orbital fashion as to generate double cones with the apices thereof at the center points of the whippletree levers, these center points accordingly being radially fixed with respect to the central axis of the internal ring member. The intermediate member being carried by the center points of the whippletree levers is thus automatically centered with respect to the central axis of the internal ring member. Each of these whippletree levers in their orbital motion at all times and in all positions establish a positive and uniform driving relation between the pair of wheels and the intermediate member so that uniform torque and speed transmission is provided.

In one form of this invention the internal ring member is held stationary so that the intermediate member is rotated at the uniform reduced speed about the central axis of the internal ring member. Here, the pure rotary motion of the intermediate member is transmitted through the connecting means carried thereby. In another form of this invention the intermediate member is held stationary by the connecting means so that the internal ring member is rotated at the uniform reduced speed about its central axis. Here the internal ring member may take the form of a drive pulley or the like.

To provide for extra heavy duty, that is where high torque loads are involved, a plurality of speed reducer units, constructed as described above, may be compounded in parallel. Here the eccentrics of the units are connected together for operation in unison, the internal ring members connected together and the intermediate members connected together. This parallel compounding of the speed reducer units increases the torque load transmission but not the speed reduction. By compounding a plurality of speed reducer units in series, multiple speed reduction may be obtained. There, the internal ring members would be connected together and held stationary to cause rotation of the intermediate members, and the intermediate member of one unit would be connected to the eccentrics of the next succeeding unit. Thus the output of one unit would form the input for the next succeeding unit to provide multiple speed reduction of almost any desired degree. Of course, the speed reducer units may be of the same or differing sizes in these arrangements. These compoundings of units for these purposes also form features of this invention.

The speed reducers of this invention may be of the gear type or of the friction type and combinations thereof and all types are contemplated herein. In the gear type, the internal ring member takes the form of an internal ring gear member and the pair of wheels takes the form of a pair of gear wheels in opposing peripheral meshing contact with the internal ring gear member. The meshing gear teeth provide a positive interlocking driving relationship to cause relative rotation because the gear wheels and the internal ring gear member as the gear wheels are orbitally moved by the eccentrics.

In the friction type speed reducer, the internal ring member takes the form of an internal friction ring member and the pair of wheels takes the form of a pair of friction wheels in opposing peripheral rolling frictional driving contact with the internal friction ring member. The engaging surfaces of the friction wheels and the internal friction ring member may be of any desired material or of any desired shape, such as a plane surface, a V-tongue and groove surface or the like, depending upon the rolling friction value desired. In the friction type speed reducer the rotatable eccentrics are preferably arranged so that they may move radially outwardly in opposite directions to maintain the peripheral rolling frictional driving contact between the friction wheels and the internal friction ring member. This maintains the desired driving contact and hence the driving relation therebetween and compensates for wear and inaccuracy in the manufacture of the parts. Suitable preloading means, such as spring means, may be provided for preloading or biasing radially outwardly the eccentrics and hence the friction wheels into rolling frictional driving contact with the internal friction ring member. As the friction wheels are orbitally moved by the eccentrics, centrifugal force may also act upon the friction wheels to maintain the driving contact and also form a part of the preloading. The rolling friction value may be regulated to any desired value by proper arrangement of the preloading means, and preloading is obtained without imposing any substantial resistance to the operation of the speed reducer. In other words, the preloading of the friction wheels in this manner has substantially no effect upon the torque load transmission.

This friction type speed reducer has a further attribute in that when the torque load increases above a predetermined value, the rolling friction drive between the friction wheels and the internal friction ring member may be caused to slip, thereby providing the speed reducer with an automatic load responsive clutch action. The point at which this declutching action takes place may be regulated by the spring means which radially moves the eccentrics in opposite directions. Novel means are also provided for correlating and driving the eccentrics.

Further objects of this invention reside in the details of construction of the speed reducers of this invention and in the cooperative relationships between the component parts thereof.

Other objects and advantages of this invention will become apparent to those skilled in the art upon reference to the accompanying specification, claims and drawings, in which:

Fig. 1 is a vertical sectional view of one form of this invention and taken substantially along the line 1—1 of Fig. 2;

Figs. 2, 3, 4 and 5 are vertical sectional views taken substantially along the lines 2—2, 3—3, 4—4 and 5—5, respectively, of Fig. 1;

Fig. 6 is a vertical sectional view of another form of this invention;

Figure 7:
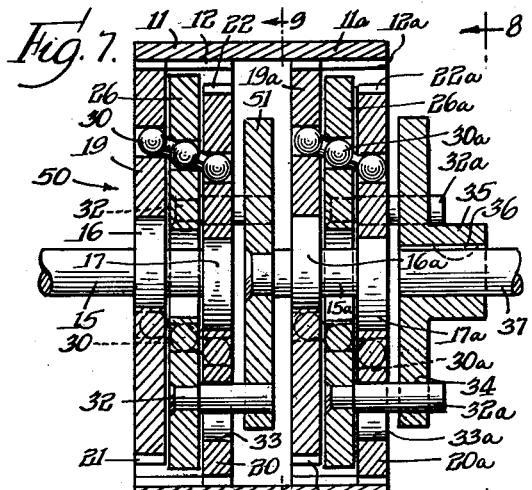
Fig. 7 is a vertical sectional view of a further form of this invention wherein a plurality of speed reducer units are compounded in series for multiple speed reduction.
Figure 8:
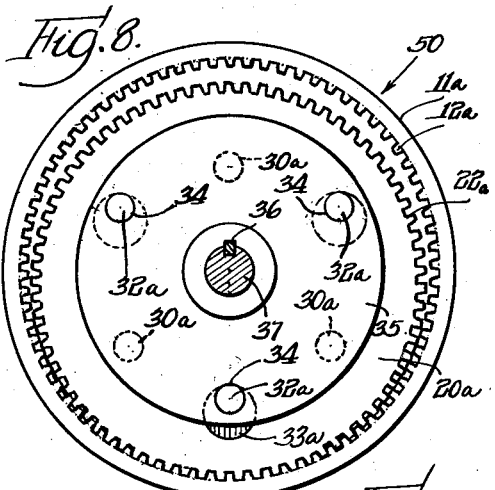
Figure 10:
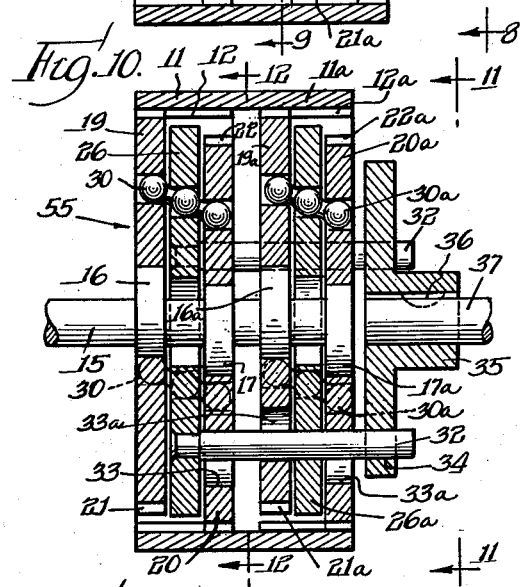
Figure 9:
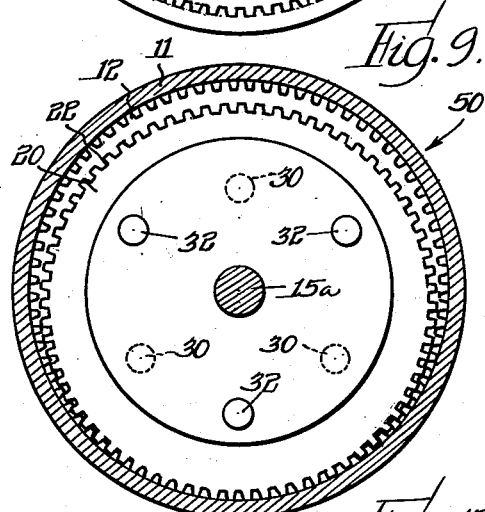
Figure 11:
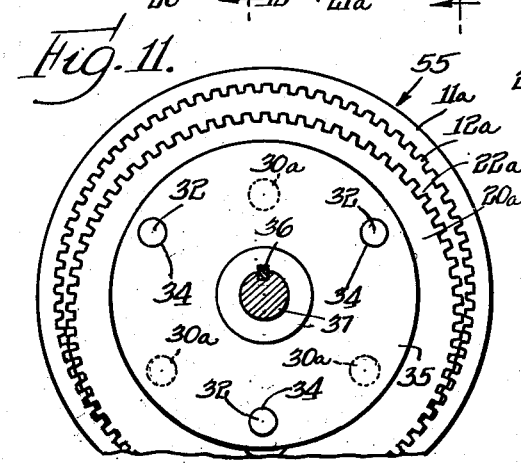
Figure 12:
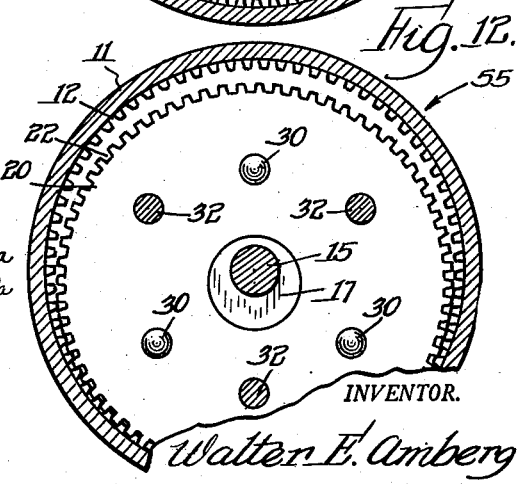

Figs. 8 and 9 are vertical sectional views taken substantially along the lines 8—8 and 9—9, respectively, of Fig. 7;

Fig. 10 is a vertical sectional view of still another form of this invention wherein the plurality of speed reducer units are compounded in parallel for high torque load transmission;

Figs. 11 and 12 are vertical sectional views taken substantially along the lines 11—11 and 12—12 of Fig. 10;

Fig. 13 is a vertical sectional view of another form of this invention, wherein a plurality of friction type speed reducer units are compounded in series for multiple speed reduction;

Fig. 14 is a vertical sectional view taken substantially along the line 14—14 of Fig. 13;

Fig. 15 is a plan view of the shaft or fitting for rotating the eccentrics of the first speed reducer unit of Fig. 13;

Fig. 16 is a horizontal sectional view through the connecting member for rotating the eccentrics of the second speed reducer unit of Fig. 13;

Figs. 17 and 18 are perspective views of the two eccentrics utilized in the first speed reducer unit of Fig. 13;

Fig. 19 is an enlarged vertical sectional view through the assembled eccentrics and taken substantially along the line 19—19 of Fig. 20;

Fig. 20 is a vertical sectional view taken substantially along the line 20—20 of Fig. 19;

Fig. 21 is a horizontal sectional view taken substantially along the line 21—21 of Fig. 19;

Fig. 22 is a vertical sectional view of still a further form of this invention, wherein a plurality of friction type speed reducer units are compounded in parallel for high torque transmission;

Fig. 23 is a vertical sectional view taken substantially along the line 23—23 of Fig. 22;

Fig. 24 is a partial sectional view taken substantially along the line 24—24 of Fig. 23;

Fig. 25 is a partial sectional view taken substantially along the line 25—25 of Fig. 23; and Fig. 26 is an exploded perspective view of the eccentrics of the first speed reducer unit of Fig. 22.

Referring first to Figs. 1 to 5 of the drawing, a gear type speed reducer is generally designated at 10. It includes an internal ring member 11 in the form of an internal ring gear member, having gear teeth 12. This internal ring member is stationarily mounted in any suitable manner and it has a central axis designated at 13. A rotatable shaft 15 has its axis of rotation concentric with the central axis 13 of the internal ring gear member 11 and it carries a pair of opposed eccentrics 16 and 17. Thus, as the shaft 15 is rotated the pair of opposed eccentrics rotate about the central axis 13.

The eccentric 16 rotatably carries a wheel 19 and the eccentric 17 rotatably carries a wheel 20, these wheels 19 and 20 being in the form of gear wheels having gear teeth 21 and 22, respectively. The gear wheels 19 and 20 are of smaller diameter than the internal ring gear member 11 and the gear teeth of the gear wheels are in opposing peripheral meshing contact with the gear teeth of the internal ring gear member. As the shaft 15 rotates, the eccentrics 16 and 17 impart orbital movement to the pair of gear wheels 19 and 20 about the central axis 13 of the internal ring gear member 11. Because the internal ring gear member 11 is stationary and because of the peripheral driving contact between the gear wheels 19 and 20 and the internal ring gear member 11, the pair of gear wheels 19 and 20 are caused, also, to rotate about their own axes 23 and 24, respectively, at a reduced speed as compared to the speed of rotation of the shaft 15. The difference between the speed of rotation of the shaft 15 and the speed of rotation of the gear wheels 19 and 20 about their own axes, that is the amount of speed reduction, is dependent upon the ratio of the wheel diameter to the difference between the wheel and ring diameters. The gear wheels 19 and 20 rotate at a uniform speed about their respective axes even though the eccentrics 16 and 17 impart orbital movement thereto about the central axis 13. Because the gear wheels 19 and 20 and their operating eccentrics 16 and 17 are diametrically oppositely located a completely balanced arrangement is provided to maintain vibration at a minimum and the axis of rotation of the shaft 15 and eccentrics 16 and 17 is automatically centered with respect to the central axis 13 of the internal ring gear member 11.

An intermediate member 26 is disposed between the pair of gear wheels 19 and 20 and whippletree driving connections are provided between the pair of gear wheels and this intermediate member. To provide these whippletree connections the gear wheels 19 and 20 and the intermediate member 26 are provided with a plurality of openings 27, 28 and 29, respectively, in the nature of sockets. These openings are correspondingly located with respect to the central axes of the gear wheels 19 and 20 and the intermediate member 26. In the speed reducer, as here illustrated, the gear wheels and intermediate member are provided with three such socket type openings which are all equally spaced from the central axis of each element. A plurality of whippletree levers 30, three levers as here illustrated, are located in the socket type openings 27, 28 and 29. The ends of these whippletree levers 30 are located within the gear wheels 19 and 20 and the center of the levers 30 are located in the intermediate member 26.

As the gear wheels 19 and 20 are orbitally moved about the central axis 13 of the internal ring gear member 11 by the eccentrics, 180 angular degrees out of phase with each other, the ends of the whipple tree levers 30 are also moved 180 angular degrees out of phase with each other through true circles having radii corresponding to the amount of excentricity of the eccentrics 16 and 17. The whippletree levers 30 being so moved in this orbital fashion generate double cones with the apices thereof at the center points of the whippletree levers. These center points which are within the intermediate member 26 are therefore radially fixed with respect to the central axis 13 of the internal ring gear member 11. Since the intermediate member 26 is carried by the center points of the whippletree levers 30, it is also automatically centered with respect to the central axis 13 of the internal ring gear member 11. Each of these whippletree levers 30, in their orbital motion at all times and in all positions, establish a positive and uniform driving relation between the pair of gear wheels 19 and 20 and the intermediate member 26 so that the intermediate member 26 is driven with uniform torque and speed as the gear wheels 19 and 20 are rotated about their respective axes. The whippletree levers 30 are made spherical in configuration where they contact the gear wheels 19 and 20 and the intermediate member 26 accurately to maintain this uniform relation. Briefly, these whippletree driving connections automatically concentrically position the intermediate member 26 with respect to the central axis 13 of the internal ring gear member 11 to provide a completely balanced arrangement. They also establish a positive and uniform driving relation between the pair of wheels 19 and 20 and the intermediate member 26 to produce uniform rotation of the intermediate member 26 about the central axis 13.

In order to take off the uniform rotating motion of the intermediate member 26, connecting means are secured thereto. As here illustrated, the connecting means comprises three pins 32 which are secured to the connecting member 26 and which extend through enlarged openings 33 formed in the gear wheel 20. The enlarged openings 33 are made sufficiently large so that the pins 32 will in no way interfere with the orbital motion of the gear wheel 20. If desired, these pins may be utilized for operating a shaft 37 and, in this connection, the pins 32 may be received in holes 34 of a flanged coupling 35 which may be secured as by a key 36 to the shaft 37.

In the form of the invention described above the ring gear member 11 is made stationary and the intermediate member 26 is driven at reduced speeds, the reduced speed motion being transmitted by the connecting means including the pins 32. If the intermediate member 26 is held stationary then the internal ring gear member 11 will be driven at the reduced speed. Such an arrangement is illustrated in Fig. 6, wherein the speed reducer is generally designated at 40. It is shown to take the form of a pulley or like device driven by a motor 41 or similar device. Like reference characters have been utilized for like parts. Here the internal ring gear member 11 takes the form of a flanged pulley 42 having internal gear teeth which are engaged by the teeth of the gear wheels 19 and 20, the gear wheels being driven by the eccentrics 16 and 17 upon rotation of the motor shaft 15. To hold stationary the intermediate member 26 the connecting means in the form of pins 43 are secured to the intermediate member 26 and extend through enlarged openings 44 in the gear wheel 19 and may be received in suitable holes 45 in the casing of the motor 41. Here, as the eccentrics 16 and 17 are rotated, the gear wheels 19 and 20 are orbitally moved, but since they are prevented from rotating about their own respective axes by the stationary intermediate member 26, the internal ring member or pulley 42 is thereupon driven at reduced speeds. The manner of operation and the various features of the speed reducer 40 of Fig. 6 are substantially the same as those of the speed reducer 10 of Figs. 1 to 5 and, therefore, a further description is not considered necessary.

In Figs. 7 to 9 there is disclosed a multiple reduction speed reducer generally designated at 50 having two speed reducer units connected in series for producing multiple speed reduction. The two speed reducer units are the same as that described above in connection with Figs. 1 to 5 and like reference characters have been utilized for like parts. The first speed reducer unit, that is the one on the input side, has identical reference characters while the second speed reducer, that is the one on the output side, has the same reference characters, with the addition of the letter *a*. While two speed reducer units have been shown for purposes of illustration, of course, any number of serially connected units may be utilized. Here the stationary internal ring gear member 11 of the first unit is connected to, as by integrally joining with, the internal ring gear member 11a of the second unit. The input shaft 15 drives the intermediate member 26 of the first unit in the manner described above. The pins 32 secured to the intermediate member 26 of the first unit and forming the connecting means therefor extend into openings in a connecting member 51 secured to the shaft 15a of the second unit. In this way the rotation of the intermediate member 26 of the first unit is transmitted to the eccentric shaft 15a of the second unit. The intermediate member 26a of the second unit drives the output shaft 37 through the connecting pins 32a. There are thus provided series connected units for obtaining two stages of speed reduction.

In Figs. 10 to 12 there is disclosed a heavy duty speed reducer generally designated at 55, including two speed reducer units compounded in parallel for producing high torque load operation. Here there is only a single stage of speed reduction. The speed reducer units and the operation thereof are like those discussed above in connection with Figs. 1 to 5 and like reference characters have been utilized for like parts, the first unit having identical reference characters and the second unit having the same reference characters followed by the letter *a*. While two units have been disclosed, of course, any number of units may be compounded. In this arrangement the internal ring gear members 11 and 11a of the two units are connected together as by integrally joining the same. The input shaft 15 drives all of the eccentrics 16, 17, 16a and 17a of both units. The intermediate members 26 and 26a of the two units are connected together by the connecting pins 32, which may also serve to transmit the rotary motion to the output shaft 37. Here, as in the case of the multiple reduction speed reducer 50, Figs. 7 to 9, the diameters and sizes of the gear wheels and internal ring gear members have been shown to be the same in the two units thereof. These dimensions and sizes may be different in the two units without altering the end results. Any suitable size and dimensions for a particular application may be utilized. In fact, in the multiple reduction speed reducer of Figs. 7 to 9 it may be desirable to make the gear wheels and internal gear member of the second or output unit of greater size and dimensions for here the operating speeds are considerably less than in the first or input unit and greater torque loads must be carried.

In Figs. 13 to 21 there is generally designated at 60 a speed reducer of the friction type having a plurality of friction type speed reducer units compounded in series for obtaining multiple speed reduction. The multiple reduction friction type speed reducer 60 includes an internal ring member 61 in the form of a casing, having a cylindrical internal friction surface 62 and an internal cylindrical friction surface 63 which are concentric with the central axis 64 of the internal ring member. The internal friction surfaces 62 and 63 of the internal ring member 61 may be separated by a partition formed of a split ring 65 received in a groove.

The first or input speed reducer unit includes a pair of wheels 66 and 67 in the form of friction wheels which are in opposing peripheral rolling frictional driving contact with the internal friction surface 62 of the internal friction ring member 61, these friction wheels 66 and 67 being 180 degrees out of phase with each other. The friction wheels 66 and 67 are moved orbitally about the central axis 64 of the internal friction ring member 61 through anti-friction bearings 68 and 69, respectively, by means of eccentrics 70 and 71, respectively. These wheels 66 and 67 so moved by the eccentrics 70 and 71 operate automatically to position the eccentrics 70 and 71 for rotation about the central axis 64 of the internal friction ring member 61, these eccentrics 70 and 71 also being 180 degrees out of phase with respect to each other.

The eccentrics 70 and 71 are illustrated in more detail in Figs. 17 to 21. The eccentric 70 is provided with a pair of projections 72 and 73, having spring seat shoulders 74 and 75, respectively, and the eccentric is provided with a groove 76 between the projections 72 and 73. The eccentric 70 also has a pair of internal side surfaces 77 and 78. On the side of the eccentric opposite to the projections 72 and 73 there is provided a projecting tongue 79 having recesses 80 and 81 on each side of the tongue 79. The eccentric 71 is of identical construction, having a pair of projections 83 and 84 provided with spring seat shoulders 85 and 86, a groove 87 between the projections 83 and 84, internal side surfaces 88 and 89, a projecting tongue 90 and recesses 91 and 92 on each side of the tongue 90. The two eccentrics 70 and 71 are assembled together with the projecting tongues 79 and 90 received in the grooves 87 and 76, respectively, and with the projections 72 and 73 and the projections 83 and 84 received in the recesses 91 and 92 and in the recesses 81 and 80, respectively. The tongues and grooves on the two eccentrics engage with each other for coupling the eccentrics together for rotation in unison, but they afford outward radial movement of the eccentrics in opposite directions from their axis of rotation. The spring seat shoulders 74, 75 and 85, 86 of the two eccentrics 70 and 71 form opposed overlapping shoulders for receiving therebetween a compression spring 95 which resiliently urges the eccentrics 70 and 71 radially outwardly in opposite directions from their axis of rotation. Thus, as the eccentrics 70 and 71 are rotated the friction wheels 66 and 67 are orbitally moved about the central axis 64. Since the coupling together of the two eccentrics 70 and 71 permits radial outward movement thereof in opposite directions, the friction wheels 66 and 67 are maintained in opposing peripheral rolling frictional driving contact with the internal surface 62 of the friction ring 61 and this is true regardless of wear between the wheels and the internal friction ring or slight inaccuracies in the manufacture thereof. The wheels 66 and 67 may be maintained in this frictional driving contact in part by centrifugal force and by the action of the compression spring 95 acting between the overlapping shoulders on the two eccentrics. The rolling friction value between the wheels and the internal frictional ring member may be regulated to any desired value by proper selection of the compression spring 95 and this may be done without imposing any substantial resistance to the overall operation of the speed reducer. As a further attribute of this friction type speed reducer, the rolling friction drive between the friction wheels and the internal friction ring member may be caused to slip when the torque load increases above a predetermined value and, therefore, provides the speed reducer with an automatic load responsive clutch action. The point at which the clutching action takes place may be regulated by the proper selection of the spring 95 which radially moves the eccentrics 70 and 71 in the opposite directions.

As in the previous forms of the invention, an intermediate member 97 is interposed between the friction wheels 66 and 67, this intermediate member 97 being concentrically supported and rotated about the central axis 64 by whippletree levers 98 in the manner explained above. Here, for purposes of illustration, there is shown to be six whippletree levers 98 which are received in suitable socket-like openings in the friction wheels 66 and 67 and the intermediate member 97, the whippletree levers 98 being spherical at the points where they contact the wheels and intermediate member. Thus, as the wheels 66 and 67 are orbitally moved about the central axis 64 and rotated about their respective axes, the intermediate member 97 is concentrically rotated at reduced speed about the central axis 64.

The pure rotary motion of the intermediate member 97 is transmitted by connecting means such as pins 99 received in holes in the intermediate member 97, extending through enlarged holes 100 in the friction wheel 67 and secured to a connecting device 101. In this way the connecting device 101 is firmly secured to the intermediate member 97 and rotates therewith at reduced speed about the central axis 64.

The eccentrics 70 and 71 of the first or input unit may be driven by a suitable fitting or shaft 103, having a flattened end 104 which is bifurcated to provide fingers 105 and 106. This shaft or fitting 103 is inserted into the speed reducer unit along the central axis 64 with the fingers 105 and 106 thereof being received in the openings in the eccentrics 70 and 71 formed by the internal side surfaces 77, 78, 88 and 89 thereof. The fingers 105 and 106 enter these openings on the opposite sides of the compression spring 95, as illustrated in more detail in Figs. 13 and 15. In this way the shaft or fitting 103 is keyed to the eccentrics 70 and 71 for rotating the same about the central axis 64.

To guide the positions of the eccentrics 70 and 71 along the central axis 64, the connecting member 101 is provided with an annular groove 108 for receiving anti-friction rollers 109 which abut against the eccentric 71. Anti-friction rollers 110 also engage the eccentric 70 and are carried in a suitable annular recess in a plate 111 secured in place within the internal friction ring member 61 by means of a suitable snap ring 112 received in a groove in the ring member.

The construction and operation of the next or output speed reducer unit of the multiple speed reducer 60 are the same as those of the first or input reducer unit and like reference characters, with the addition of the letter a, have been utilized for like parts. The eccentrics 70a and 71a of the second speed reducer unit are driven by the connecting member 101 and, in this respect, the connecting member 101 is provided with a pair of fingers 115 and 116 received in the openings in the eccentrics 70a and 71a on opposite sides of the compression spring 95a, as illustrated more clearly in Figs. 13, 14 and 16. In the manner pointed out above, the intermediate member 97a is driven at a reduced speed with respect to the speed of rotation of the connecting member 101 to provide multiple speed reduction. This reduced speed rotary motion of the intermediate member 97a is transmitted by means of connecting means including a plurality of pins 99a secured to the intermediate member 97a and extending through openings 100a in the friction wheel 67a. The output end of the speed reducer 60 is at least partially closed by an annular plate 118 received in a suitable circular recess formed in a flange 119 on the internal friction ring member 61. This annular plate 118 is provided with a plurality of holes 120 for receiving the connecting pins 99a, the plate 118 rotating with the connecting pins 99a. The connecting pins 99a may be received in slots 122 in a flange 123 formed on a shaft 124 for providing rotary motion to the shaft 124. The anti-friction bearings 68a and 69a in addition to rotatably mounting the friction wheels 66a and 67a may also operate to maintain the eccentrics 70a and 71a in proper longitudinal position along the central axis 64. As illustrated, the parts of the second or output unit of the speed reducer 60 may be of larger size and dimensions than those of the first or input unit since the second or output unit, while operating at slower speeds, does operate to transmit greater torque loads. Of course, any number of speed reducer units may be compounded in series to obtain the desired degree of speed reduction.

The speed reducer generally designated at 130 in Figs. 22 to 24 is also of the friction type and is shown to include a plurality of speed reducer units compounded in parallel for transmitting large torque loads. Here the heavy duty speed reducer 130 includes an internal friction ring member 131 having internal cylindrical friction surfaces 132 and 132a which are integrally formed together. These friction surfaces 132 and 132a have a common central axis 133. One end of the speed reducer is provided with an end plate 134 having a bearing 135 for supporting an input shaft 136. The other or output end of the speed reducer 130 is provided with an end plate 137 having a bearing 138 for supporting an output shaft 139. The output shaft 139 has an internal bearing 140 for journalling the inner end of the input shaft 136.

Between the bearings 135 and 140 the shaft 136 is squared as indicated at 142. The first reducer unit includes a pair of eccentrics 143 and 144 mounted on the squared portion 142 of the shaft 136. In this respect the eccentric 143 is provided with a substantially rectangular opening 145 receiving the squared portion 142 of the shaft so that the eccentric 143 is caused to rotate with the shaft, but yet is permitted to slide radially outwardly therefrom. This eccentric 143 is also provided with a pair of shoulders 146 and 147. The other eccentric 144 is likewise provided with a substantially rectangular opening 148 for receiving the squared portion 142 of the shaft 136 in order to mount the eccentric 144 for rotation with the shaft but yet permit radial movement of the eccentric 144 outwardly from the shaft in the opposite direction. This eccentric 144 is also provided with shoulders 149 and 150 which overlap the shoulders 146 and 147 of the eccentric 143 when the two eccentrics are assembled together. A pair of springs 151 are located on opposite sides of the squared portion 142 of the shaft 136 between the overlapping shoulders 146, 147 and 149, 150, this spring operating to move the two eccentrics radially outwardly in opposite directions. These eccentrics are, therefore, rotated 180 degrees out of phase with each other and are spring biased outwardly.

The eccentric 143 carries a friction wheel 156 by means of anti-friction bearings 155 and, likewise, the eccentric 144 carries a friction wheel 158 by means of anti-friction bearings 157. The friction wheels 156 and 158 are also 180 angular degrees out of phase with respect to each other and are resiliently urged into opposed peripheral rolling frictional driving contact with the internal cylindrical surface 132 of the internal friction ring member 131. An intermediate member 160 is interposed between the two friction wheels 156 and 158 and is concentrically positioned and rotated about the central axis 133 by movement of the friction wheels 156 and 158 by means of whippletree levers 161 in the same manner as described above in connection with the other forms of this invention.

The second speed reducer unit of the speed reducer 130 is the same as the first speed reducer unit and operates in the same manner and like reference characters, with the addition of the letter $a$, have been utilized for like parts. Here the eccentrics 143a and 144a are secured in the same fashion to the squared portion 142 of the shaft 136 so that the two speed reducer units operate in parallel. The intermediate members 160 and 160a of the two reducer units are connected together for simultaneous rotation about the central axis 133 by connecting pins 163, these connecting pins extending through enlarged openings 164 in the friction wheels 158 and 156a. To transmit the pure rotary motion of the intermediate members 160 and 160a to the output shaft 139, connecting pins 165 may be secured between the intermediate member 160a and a flange 167 on the output shaft 139, these connecting pins 165 extending through enlarged openings 166 in the friction wheel 158a.

The friction type speed reducers illustrated in Figs. 13 to 26 operate in substantially the same way as do the gear type speed reducers illustrated in Figs. 1 to 12 in that they operate with uniform speed and torque transmission in performing their speed reducing functions and do so with a completely balanced construction, thereby maintaining vibration at an absolute minimum. In the gear type speed reducer there is a positive locking between the internal ring member and the wheels to provide a positive action. In the friction type unit there is a rolling frictional driving contact between the wheels and the internal ring member but because of centrifugal force and the action of the spring means for separating the wheels in opposite directions, there is little or no slippage between the wheels and the internal ring member under normal speed and load conditions so that here, likewise, a positive driving action is also afforded. In the friction speed reducer, if the load should rise above a predetermined amount then slippage will occur between the wheels and the internal ring member so that the speed reducer will operate also as an automatic load responsive clutch. The speed reducer of this invention in either the gear type or friction type, or both, may comprise a single unit or a plurality of units compounded in series or parallel depending upon the amount of speed reduction desired and the torque loads to be accommodated. Also, the speed reducer may be formed of both friction and gear type units as, for example, wherein the input unit would be a friction type where high speeds and low torques are present, and wherein the output unit may be of the gear type where relatively low speeds and high torque loads are present.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A speed reducer comprising, an internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and relative rotation between the pair of wheels and the internal ring member, an intermediate member disposed between the pair of spaced wheels, and whippletree driving connections between the pair of spaced wheels and the intermediate member for concentrically positioning the intermediate member with respect to the central axis of the internal ring member and for establishing a driving relation between the pair of spaced wheels and the intermediate member to produce relative rotation between the intermediate member and the internal ring member.

2. A speed reducer comprising, an internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and relative rotation between the pair of wheels and the internal ring member, an intermediate member disposed between the pair of spaced wheels, whippletree driving connections between the pair of spaced wheels and the intermediate member for concentrically positioning the intermediate member with respect to the central axis of the internal ring member and for establishing a driving relation between the pair of spaced wheels and the intermediate member to produce relative rotation between the intermediate member and the internal ring member, and connecting means extending through enlarged openings in at least one of the wheels and secured to the intermediate member.

3. A speed reducer comprising, a stationary internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and rotation of said wheels about their respective axes, an intermediate member disposed between the pair of spaced wheels, and whippletree driving connections between the pair of spaced wheels and the intermediate member for concentrically positioning the intermediate member with respect to the central axis of the internal ring member and for rotatably driving the intermediate member as the wheels rotate about their respective axes.

4. A speed reducer comprising, a stationary internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and rotation of said wheels about their respective axes, an intermediate member disposed between the pair of spaced wheels, whippletree driving connections between the pair of spaced wheels and the intermediate member for concentrically positioning the intermediate member with respect to the central axis of the internal ring member and for rotatably driving the intermediate member as the wheels rotate about their respective axes, and connecting means secured to and driven by the intermediate member and extending through enlarged openings in at least one of the wheels.

5. A speed reducer comprising, a pair of connected opposed eccentrics rotatable about a common axis, a pair of spaced wheels carried by the eccentrics, an internal ring member of larger diameter than the wheels having a central axis concentric with the rotating axis of the eccentrics and in opposed peripheral driving contact with the pair of wheels, rotation of said eccentrics causing orbital movement of said pair of wheels about the central axis of the internal ring member and rotation of the internal ring member about its central axis, an intermediate member disposed between the pair of spaced wheels, means for securing the intermediate member against rotation, and whippletree connections between the pair of spaced wheels and the intermediate member for concentrically positioning the intermediate member with respect to the central axis of the internal ring member and for securing the wheels against rotation about their respective axes to cause rotation of the internal ring member about its central axis.

6. A speed reducer comprising, a pair of connected opposed eccentrics rotatable about a common axis, a pair of spaced wheels carried by the eccentrics, an internal ring member of larger diameter than the wheels having a central axis concentric with the rotating axis of the eccentrics and in opposed peripheral driving contact with the pair of wheels, rotation of said eccentrics causing orbital movement of said pair of wheels about the central axis of the internal ring member and rotation of the internal ring member about its central axis, an intermediate member disposed between the pair of spaced wheels, connecting means extending through enlarged openings in at least one of the wheels and secured to the intermediate member for securing the same against rotation, and whippletree connections between the pair of spaced wheels and the intermediate member for concentrically positioning the intermediate member with respect to the central axis of the internal ring member and for securing the wheels against rotation about their respective axes to cause rotation of the internal ring member about its central axis.

7. A speed reducer comprising, an internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and relative rotation between the pair of wheels and the internal ring member, an intermediate member disposed between the pair of spaced wheels, a plurality of openings in each of the wheels and the intermediate member and correspondingly located with respect to the central axis of each thereof, and a plurality of whippletree levers carried in the openings and extending between the pair of spaced wheels and the intermediate member for concentrically positioning the intermediate member with respect to the central axis of the internal ring member and for establishing a driving relation between the pair of spaced wheels and the intermediate member to produce relative rotation between the intermediate member and the internal ring member.

8. A speed reducer comprising, a stationary internal ring member, a pair of connected opposed eccentrics rotatable about an axis concentric with the central axis of the internal ring member, a pair of spaced wheels of smaller diameter than the internal ring member carried by the eccentrics in opposing peripheral driving contact with the internal ring member, rotation of said eccentrics causing orbital movement of said pair of wheels about the central axis of the internal ring member and rotation of said wheels about their respective axes, an intermediate member disposed between the pair of spaced wheels, a plurality of openings in each of the wheels and the intermediate member and correspondingly located with respect to the central axis of each thereof, and a plurality of whippletree levers carried in the openings and extending between the pair of spaced wheels and the intermediate member for concentrically positioning the intermediate member with respect to the central axis of the internal ring member and for rotatably driving the intermediate member as the wheels rotate about their respective axes.

9. A speed reducer comprising, a pair of connected opposed eccentrics rotatable about a common axis, a pair of spaced wheels carried by the eccentrics, an internal ring member of larger diameter than the wheels having a central axis concentric with the rotating axis of the eccentrics and in opposed peripheral driving contact with the pair of wheels, rotation of said eccentrics causing orbital movement of said pair of wheels about the central axis of the internal ring member and rotation of the internal ring member about its central axis, an intermediate member disposed between the pair of spaced wheels, means for securing the intermediate member against rotation, a plurality of openings in each of the wheels and the intermediate member and correspondingly located with respect to the central axis of each thereof, and a plurality of whippletree levers carried in the openings and extending between the pair of spaced wheels and the intermediate member for concentrically positioning the intermediate member with respect to the central axis of the internal ring member and for securing the wheels against rotation about their respective axes to cause rotation of the internal ring member about its central axis.

10. In a speed reducer having an internal ring member, a pair of wheels of smaller diameter than the internal ring member and a pair of rotating eccentrics for driving the pair of wheels in opposing peripheral driving contact with the internal ring member, an intermediate member disposed between the pair of wheels, a plurality of openings in each of the wheels and the intermediate member, and a plurality of whippletree levers carried in the openings and extending between the pair of wheels and the intermediate member for concentrically positioning the intermediate member with respect to the internal ring member and for establishing a driving relation between the pair of wheels and the intermediate member to produce relative rotation between the intermediate member and the internal ring member.

11. In a speed reducer having an internal ring member, a pair of wheels of smaller diameter than the internal ring member and a pair of rotating eccentrics for driving the pair of wheels in opposing peripheral driving contact with the internal ring member, an intermediate member disposed between the pair of wheels, a plurality of openings in each of the wheels and the intermediate member, a plurality of whippletree levers carried in the openings and extending between the pair of wheels and the intermediate member for concentrically positioning the intermediate member with respect to the internal ring member and for establishing a driving relation between the pair of wheels and the intermediate member to produce relative rotation between the intermediate member and the internal ring member, and connecting means secured to the intermediate member and extending through enlarged openings in at least one of the wheels.

12. A heavy duty speed reducer comprising, a plurality of speed reducer units, each including an internal ring member, a pair of wheels of smaller diameter than the internal ring member, a pair of rotating eccentrics for driving the pair of wheels in opposing peripheral driving contact with the internal ring member, an intermediate member disposed between the pair of wheels and whippletree connections between the pair of wheels and the intermediate member for concentrically positioning the intermediate member with respect to the internal ring member and for establishing a driving relation between the pair of wheels and the intermediate member to produce relative rotation between the intermediate member and the internal ring member, means for connecting together the internal ring members of all of the units, means for driving in unison the eccentrics of all of the units, and means for connecting together the intermediate members of all of the units.

13. A multiple reduction speed reducer comprising, a plurality of speed reducer units, each including a stationary internal ring member, a pair of wheels of smaller diameter than the internal ring member, a pair of rotating eccentrics for driving the pair of wheels in opposing peripheral driving contact with the internal ring member, an intermediate member disposed between the pair of wheels and whippletree connections between the pair of wheels and the intermediate member for concentrically positioning the intermediate member with respect to the internal ring member and for rotatably driving the intermediate member, means for connecting together the internal ring members of all of the units, and means connected to the intermediate member of each unit for driving the eccentrics of a subsequent unit.

14. A heavy duty speed reducer comprising, a plurality of speed reducer units, each including an internal ring member, a pair of wheels of smaller diameter than the internal ring member, a pair of rotating eccentrics for driving the pair of wheels in opposing peripheral driving contact with the internal ring member, an intermediate member disposed between the pair of wheels and whippletree connections between the pair of wheels and the intermediate member for concentrically positioning the intermediate member with respect to the internal ring member and for establishing a driving relation between the pair of wheels and the intermediate member to produce relative rotation between the intermediate member and the internal ring member, and connecting means secured to the intermediate members of all of the units and extending through enlarged openings in the wheels of all of the units.

15. A multiple reduction speed reducer comprising, a plurality of speed reducer units, each including a stationary internal ring member, a pair of wheels of smaller diameter than the internal ring member, a pair of rotating eccentrics for driving the pair of wheels in opposing peripheral driving contact with the internal ring member, an intermediate member disposed between the pair of wheels and whippletree connections between the pair of wheels and the intermediate member for concentrically positioning the intermediate member with respect to the internal ring member and for rotatably driving the intermediate member, means for connecting together the internal ring members of all of the units, and connecting means secured to the intermediate member of each unit and extending through enlarged openings in one of the wheels of that unit for driving the eccentrics of a subsequent unit, the connecting means of the last unit forming the output drive of the speed reducer.

16. A speed reducer comprising, an internal ring member, a pair of wheels of smaller diameter than the internal ring member, a pair of rotating eccentrics for driving the pair of wheels in opposing peripheral driving contact with the internal ring member, an intermediate member disposed between the pair of wheels, and whippletree connections between the pair of wheels and the intermediate member for concentrically positioning the intermediate member with respect to the internal ring member and for establishing a driving relation between the pair of wheels and the intermediate member to produce relative rotation between the intermediate member and the internal ring member.

17. A speed reducer comprising, an internal ring member, a pair of wheels of smaller diameter than the internal ring member, a pair of rotating eccentrics for driving the pair of wheels in opposing peripheral driving contact with the internal ring member, an intermediate member disposed between the pair of wheels, whippletree connections between the pair of wheels and the intermediate member for concentrically positioning the intermediate member with respect to the internal ring member and for establishing a driving relation between the pair of wheels and the intermediate member to produce relative rotation between the intermediate member and the internal ring member, and connecting means secured to the intermediate member and extending through enlarged openings in at least one of the wheels.

18. A gear type speed reducer comprising, an internal ring gear member, a pair of gear wheels of smaller diameter than the internal ring gear member, a pair of rotating eccentrics for driving the pair of gear wheels in opposing peripheral meshing contact with the internal ring gear member, an intermediate member disposed between the pair of gear wheels, and whippletree connections between the pair of gear wheels and the intermediate member for concentrically positioning the intermediate member with respect to the internal ring gear member and for establishing a driving relation between the pair of gear wheels and the intermediate member to produce relative rotation between the intermediate member and the internal ring gear member.

19. A friction type speed reducer comprising, an internal friction ring member, a pair of friction wheels of smaller diameter than the internal friction ring member, a pair of rotating eccentrics for driving the pair of friction wheels in opposing peripheral rolling frictional driving contact with the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

20. In a friction type speed reducer, the combination of, an internal friction ring member, a pair of adjacent and opposed eccentrics rotatable about an axis concentric with the central axis of the internal friction ring member and provided with overlapping shoulders, spring means between the overlapping shoulders for resiliently urging the eccentrics radially outwardly in opposite directions from their axis of rotation, and a pair of friction wheels of smaller diameter than the internal friction ring member carried by the eccentrics in opposing peripheral rolling frictional driving contact with the internal friction ring member.

21. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, and means for urging the eccentrics radially outwardly in opposite directions from their axis of rotation for maintaining the peripheral rolling frictional driving contact between the friction wheels and the internal friction ring member.

22. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, and means for coupling the eccentrics together for rotation in unison but affording outward radial movement thereof in opposite directions from their axis of rotation for maintaining the peripheral rolling frictional driving contact between the friction wheels and the internal friction ring member.

23. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, and a tongue and groove on each eccentric engaging with each other for coupling the eccentrics together for rotation in unison but affording outward radial movement thereof in opposite directions from their axis of rotation for maintaining the peripheral rolling frictional driving contact between the friction wheels and the internal friction ring member.

24. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, a tongue and groove on each eccentric engaging with each other for coupling the eccentrics together for rotation in unison but affording outward radial movement thereof in opposite directions from their axis of rotation, a shoulder on each eccentric overlapping the other, and spring means between the overlapping shoulders for resiliently urging the eccentrics radially outwardly to maintain the opposing peripheral rolling frictional driving contact between the friction wheels and the internal friction ring member.

25. In a friction type speed reducer, the combination of, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, and a pair of friction wheels of smaller diameter than the internal friction ring member carried by the eccentrics in opposing peripheral rolling frictional driving contact with the internal friction ring member.

26. In a friction type speed reducer, the combination of, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, a pair of friction wheels of smaller diameter than the internal friction ring member carried by the eccentrics in opposing peripheral rolling frictional driving contact with the internal friction ring member, and means for urging the eccentrics radially outwardly in opposite directions from the axis of rotation for maintaining the peripheral rolling frictional driving contact between the friction wheels and the internal friction ring member.

27. In a friction type speed reducer, the combination of, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, a pair of friction wheels of smaller diameter than the internal friction ring member carried by the eccentrics in opposing peripheral rolling frictional driving contact with the internal friction ring member, overlapping shoulders on the eccentrics, and spring means between the overlapping shoulders for resiliently urging the eccentrics radially outwardly in opposite directions from the axis of rotation for maintaining the peripheral rolling frictional driving contact between the friction wheels and the internal friction ring member.

28. A friction type speed reducer comprising, an internal friction ring member, a pair of adjacent and opposed eccentrics rotatable about an axis concentric with the central axis of the internal friction ring member and provided with overlapping shoulders, spring means between the overlapping shoulders for resiliently urging the eccentrics radially outwardly in opposite directions from their axis of rotation, a pair of friction wheels of smaller diameter than the internal friction ring member carried by the eccentrics in opposing peripheral rolling frictional driving contact with the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

29. A friction type speed reducer comprising, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, means for urging the eccentrics radially outwardly in opposite directions from their axis of rotation for maintaining the peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

30. A friction type speed reducer comprising, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, means for coupling the eccentrics together for rotation in unison but affording outward radial movement thereof in opposite directions from their axis of rotation for maintaining the peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

31. A friction type speed reducer comprising, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, a tongue and groove on each eccentric engaging with each other for coupling the eccentrics together for rotation in unison but affording outward radial movement thereof in opposite directions from their axis of rotation for maintaining the peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

32. A friction type speed reducer comprising, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, a tongue and groove on each eccentric engaging with each other for coupling the eccentrics together for rotation in unison but affording outward radial movement thereof in opposite directions from their axis of rotation, a shoulder on each eccentric overlapping the other, spring means between the overlapping shoulders for resiliently urging the eccentrics radially outwardly to maintain the opposing peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

33. A friction type speed reducer comprising, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, a pair of friction wheels of smaller diameter than the internal friction ring member carried by the eccentrics in opposing peripheral rolling frictional driving contact with the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

34. A friction type speed reducer comprising, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, a pair of friction wheels of smaller diameter than the internal friction ring member carried by the eccentrics in opposing peripheral rolling frictional driving contact with the internal friction ring member, means for urging the eccentrics radially outwardly in opposite directions from the axis of rotation for maintaining the peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

35. A friction type speed reducer comprising, an internal friction ring member, a drive shaft rotatable about an axis concentric with the central axis of the internal friction ring member, a pair of adjacent and opposed eccentrics mounted on the drive shaft for rotation therewith but slidably radially movable in opposite directions from the axis of rotation, a pair of friction wheels of smaller diameter than the internal friction ring member carried by the eccentrics in opposing peripheral rolling frictional driving contact with the internal friction ring member, overlapping shoulders on the eccentrics, spring means between the overlapping shoulders for resiliently urging the eccentrics radially outwardly in opposite directions from the axis of rotation for maintaining the peripheral rolling frictional driving contact between the friction wheels and the internal friction ring member, an intermediate member disposed between the pair of friction wheels, and whippletree connections between the pair of friction wheels and the intermediate member for concentrically positioning the intermediate member with respect to the internal friction ring member and for establishing a driving relation between the pair of friction wheels and the intermediate member to produce relative rotation between the intermediate member and the internal friction ring member.

36. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, a tongue and groove on each eccentric engaging with each other for coupling the eccentrics together for rotation in unison but affording outward radial movement thereof in opposite directions from their axis of rotation for maintaining the peripheral rolling frictional driving contact between the friction wheels and the internal friction ring member, and a pair of openings in each of the eccentrics for receiving a bifurcated end of a rotatable shaft for rotating the eccentrics.

37. In a friction type speed reducer, the combination of, an internal friction ring member, a pair of adjacent and opposed eccentrics rotatable about an axis concentric with the central axis of the internal friction ring member, a pair of friction wheels of smaller diameter than the internal friction ring member carried by the eccentrics in opposing peripheral rolling frictional driving contact with the internal friction ring member, a tongue and groove on each eccentric engaging with each other for coupling the eccentrics together for rotation in unison but affording outward radial movement thereof in opposite directions from their axis of rotation, a shoulder on each eccentric overlapping the other, spring means between the overlapping shoulders for resiliently urging the eccentrics radially outwardly to maintain the opposing peripheral rolling frictional driving contact between the friction wheels and the internal friction ring member, and a pair of openings in each of the eccentrics for receiving a bifurcated end of a rotatable shaft for rotating the eccentrics.

WALTER E. AMBERG.

References Cited in the file of this patent

UNITED STATES PATENTS

| Number | Name | Date |
|---|---|---|
| 449,900 | Clemons | Apr. 7, 1891 |
| 890,107 | Van Decar | June 9, 1908 |
| 1,365,492 | Hotlee | Jan. 11, 1921 |
| 1,910,777 | Soddy | May 23, 1933 |
| 2,170,951 | Perry | Aug. 29, 1939 |
| 2,502,316 | Erickson | Mar. 28, 1950 |
| 2,508,121 | McIver | May 16, 1950 |
| 2,520,282 | Henry | Aug. 29, 1950 |